United States Patent [19]

Urbach

[11] 4,122,551

[45] Oct. 24, 1978

[54] OPTICAL DATA STORAGE AND RETRIEVAL SYSTEM

[75] Inventor: John C. Urbach, Portola Valley, Calif.

[73] Assignee: Xerox Corporation, Stamford, Conn.

[21] Appl. No.: 785,884

[22] Filed: Apr. 8, 1977

[51] Int. Cl.² .............................................. G11C 13/04
[52] U.S. Cl. ............................ 365/234; 179/100.3 V; 358/128; 365/127; 365/215
[58] Field of Search ................. 340/173 LT, 173 LM; 358/128, 130, 132; 179/100.3 V; 365/120, 121, 124, 126, 127, 215, 234

[56] References Cited

U.S. PATENT DOCUMENTS 2,718,549  9/1955  Mattke ................................. 358/132
3,737,877  6/1973  Feinleit ........................... 340/173 LT
4,063,226  12/1977  Kozma et al. ......................... 365/125

Primary Examiner—Stuart N. Hecker

[57] ABSTRACT

An optical data storage and display system which utilizes the recorded pattern on an optical disk to modulate directly the output or writing light beam incident thereon, thereby eliminating the light modulator of conventional output scanner systems. The optical disk is fixed coaxially to the same motor drive shaft as a rotating multi-faceted output scanner such that each facet of the scanner automatically corresponds geometrically to a data sector of the optical disk, thereby eliminating the need for servo synchronization between the optical disk and the scanner and the large data buffering that such servo synchronization necessitates.

2 Claims, 2 Drawing Figures

OPTICAL DATA STORAGE AND RETRIEVAL SYSTEM

BACKGROUND OF THE INVENTION

In U.S. Pat. No. 3,721,756, a system is disclosed for producing a display on a screen wherein a multi-track magnetic storage drum is employed for storage of information to be displayed. A multi-faceted mirror scanner is mounted for rotation in predetermined relation with respect to the magnetic storage drum by mounting the mirror and the drum on a common drive shaft. A plurality of sources produce light beams which are incident on the mirror scanner in a selected pattern and reflected thereby to sweep a display screen. Electrically driven light modulators, preferably of the acousto-optic type, individually amplitude modulate the light beams in accordance with information read from the drum by magnetic read/write heads disposed adjacent the periphery of the drum.

Due to the mirror scanner and the storage drum being mounted on a common shaft, the described system eliminates the need for servo synchronization between the mirror scanner drive and the drum drive. Furthermore, the described system reduces the data buffering requirements from those determined largely by servo errors to much smaller ones determined by drum location and facet angle errors of the mirror scanner.

Although the described system reduces servo synchronization and data buffer requirements, it is still a complex system since it requires, in addition to the magnetic storage drum, the mirror scanner, and the light sources, a bank of read/write heads and a plurality of light amplitude modulators. A substantially simplified display system would result if the functions of the read/write heads and light amplitude modulators could be assumed by the data storage component of the system.

OBJECTS OF THE INVENTION

It is an object of the present invention to provide an improved data storage and display system.

It is a further object of the present invention to provide a data storage and display system having increased simplicity resulting from dual functionality of parts.

SUMMARY OF THE INVENTION

In accordance with the invention, a multi-track write-once or read-only optical data storage disk, mounted on a common shaft with a multi-faceted optical scanner device, is provided as the data storage component of a data storage and display system. Rather than following the conventional approach of photoelectrically detecting the pattern of holes or transparent areas in the optical data storage disk, and using that signal, with or without further processing or buffering, to drive a printing light beam modulator, the system of the present invention uses the recorded pattern on the optical disk to modulate directly a write light beam incident thereon. The optical disk, in such a system, is written in such a manner that transparent regions on a transmitting optical disk or reflective regions on a reflecting optical disk, have a one-to-one correspondence to areas which must be exposed to light to provide the desired display. Thus, after incidence on a track of the optical disk, the write light beam is fully modulated by the optical disk pattern and is ready for scanning by the multi-faceted optical scanner. Besides eliminating the pick-up devices and electrically controlled light amplitude modulators of prior art systems, the present invention permits the same laser to be used for writing the data stored on the optical disk and for printing the output data pattern.

DETAILED DESCRIPTION OF THE INVENTION

Figure 1:
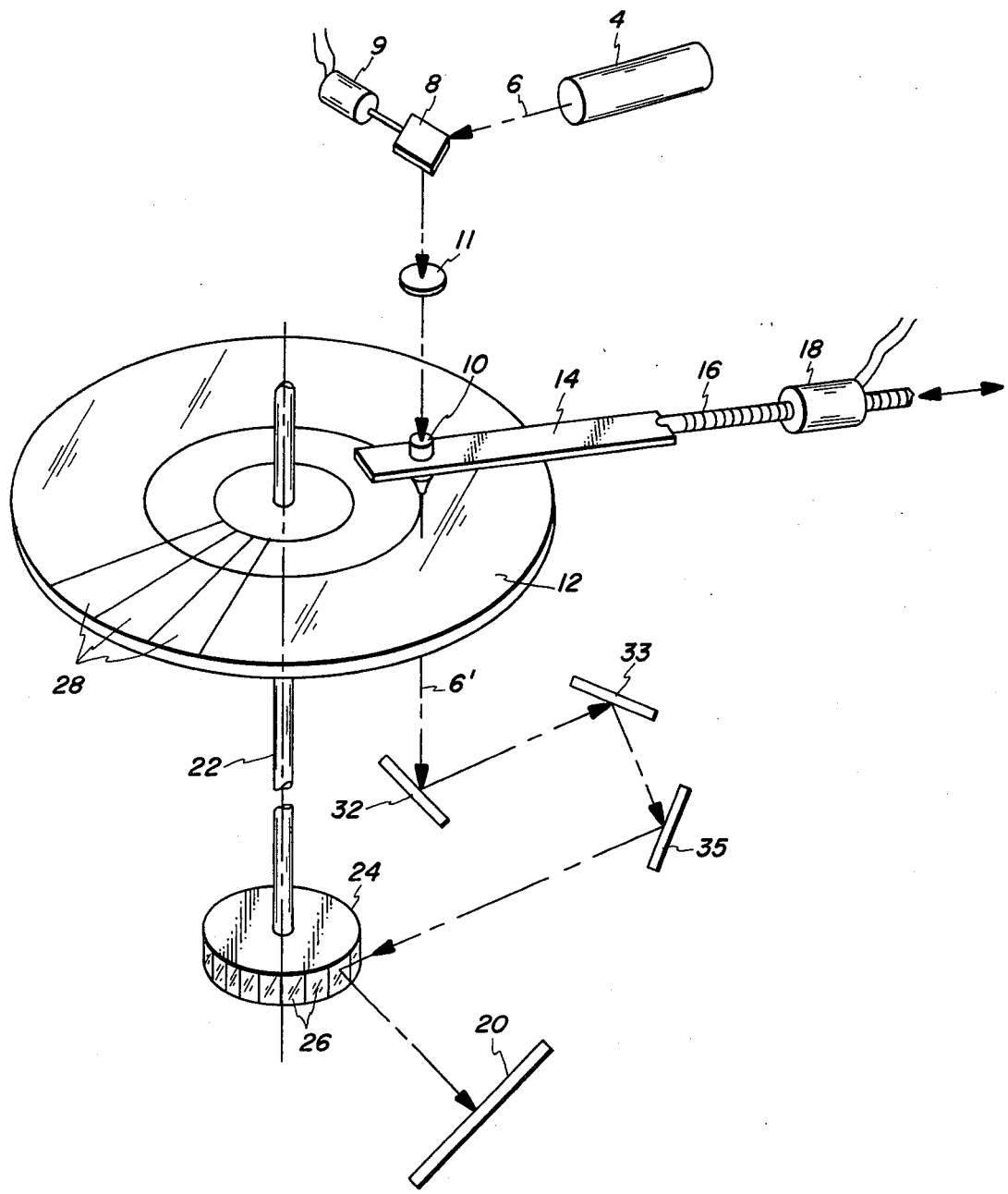
FIG. 1 is a schematic representation of one embodiment of an optical data storage and display system in accordance with the present invention.

Referring now to FIG. 1, the embodiment of the invention depicted utilizes a laser 4 of conventional design to produce a high intensity light beam 6. Beam 6 is reflected by the mirror 8 of an electrically controlled galvanometer 9 and is focused by imaging lens 11 and microscopic objective lens 10 onto a data track of a multi-track optical data storage disk 12. Lens 10 is supported for radial movement relative to the center of the disk 12 by means of a support 14 coupled to a lead screw drive arrangement comprised of lead screw 16 and lead screw drive motor 18. The control signals delivered to the galvanometer and the lead screw drive motor are synchronized in a conventional manner such that the mirror 8 directs the beam 6 to the center of the data track over which the lens 10 is positioned.

The optical data storage disk 12 is of conventional design and in the system shown in FIG. 1 would be of the transmitting type which has transparent regions with a one-to-one correspondence to areas which must be exposed to light on the light sensitive medium 20. For example, disk 12 can be comprised of a thin photodispersible metal coating on a light transparent support substrate, such as, for example, a thin coating of Bismuth on a glass substrate, the metal coating having been previously removed by a high intensity writing light beam (not shown) in those areas where the light sensitive medium 20 is to be exposed. A reflective type optical data storage disk having light reflective areas in a one-to-one correspondence with the portions of the light sensitive medium 20 to be exposed can be substituted for the light transmitting optical data storage disk 12, provided that the optical path of the beam 6' subsequent to impingement on the optical disk is modified to accommodate the reflected beam. Other types of optical data storage disks can be utilized and other types of such disks are described in U.S. Pat. No. 3,314,073.

The disk 12 is mounted on a motor drive shaft 22 which is common to a multi-faceted mirror polygon scanner 24 of conventional design which provides a scanning motion for the information modulated light beam of the system. Preferably, each of the mirror facets 26 of the scanner 24 corresponds to a data storage sector 28 of the optical disk 12, and the scanner 24 and the disk 12 are mounted on the shaft 22 to provide each mirror facet 26 with an automatic geometrical alignment with one of the data sectors 28 of the optical disk 12. Such an arrangement eliminates the need for servo synchronizing the rotation of the disk 12 with the rotation of the scanner 24, and reduces the data buffering requirements from those determined largely by servo error to much smaller ones determined by disk location and mirror facet angle errors.

Optical data storage technology is available that is capable of storing information at an along-track density of at least 500 bits/mm. Thus, rotation of the disk 12 causes the light beam 6 to be amplitude modulated by the track of the disk 12 upon which the beam 6 is incident. Specifically, an amplitude modulated beam 6' is achieved by passage of the beam 6 through the light transparent portions of disk 12 and absorption or reflection of the beam 6 not incident on light transparent portions of the disk 12. The information modulated light beam 6' is incident on a facet mirror 26 of the scanner 24 via reflection from mirrors 32, 33 and 35. Rotation of the light reflecting mirror facet 26 causes the information modulated light beam 6' to scan the light sensitive surface 20 to thereby impart the information content of at least a portion of the disk to the surface 20. Thus, the system of the present invention eliminates the requirements for electrically controlled light amplitude modulators and photodetector devices to derive the electrical signals to drive those modulators.

The system described requires precise geometric correspondence between facet position and data location on the disk 12. Skew between data and facets would result in a shearing of the printed data or image. If the dominant factor in such skew were facet errors, the shear should occur as often as every scan line. If it were disk sector initialization errors, image shear would occur every scanner revolution.

Figure 2:
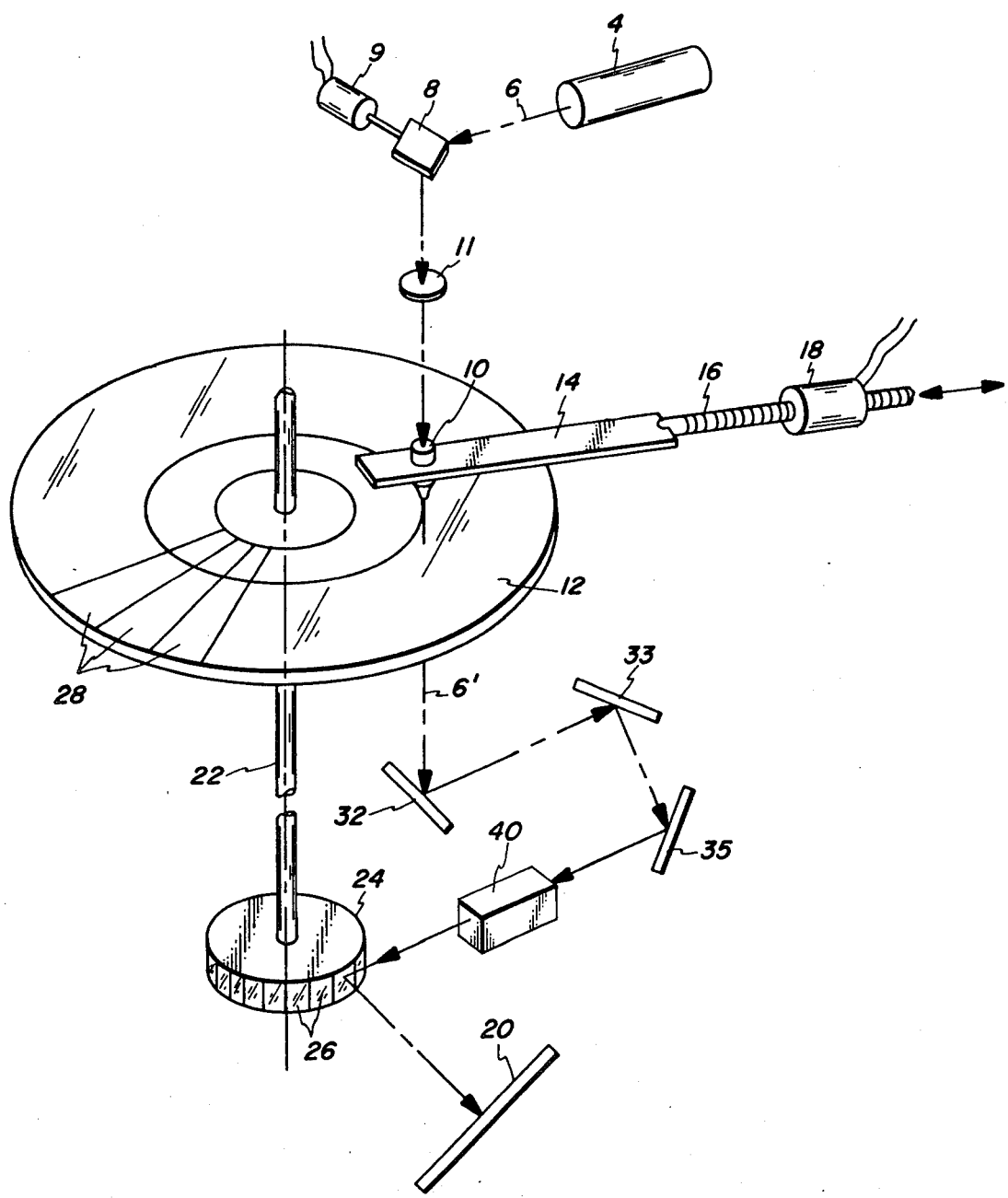
FIG. 2 is a modified embodiment of an optical data storage and display system in accordance with the present invention.

A solution to the shearing problem as contemplated by the invention includes an optical delay line. Referring now to FIG. 2, an optical delay line 40 is interposed between the mirror 35 and the scanner 24. Optical delay line 40 is of conventional construction and can be a single mode fibre of a material having a refractive index substantially greater than that of air such that, in the case of a data sector of the disk 12 being in advance of the start of scan position of the facet of the scanner 24 corresponding to that data sector, the amplitude modulated light beam 6' would be delayed in time slightly by the optical delay line 40 such that the arrival time of the data stream at the scanner facet is adjusted to correspond to the start of scan position of that scanner facet.

The need for correction of the geometric position of the data sectors and the scanner facets partly vegates the virtue of simplicity gained by eliminating photodetector and modulator subsystems. Therefore, it is desirable to consider how the necessary precise space relationship between disk data and scanner facets can be maintained. One method of maintaining such precision is having commonality between components of the output scanner and components of the input scanner or data recorder. In this case, with the addition of a high bandwidth light modulator, essential to any optical data recorder, light derived from an input scanning laser can be used to record on a photosensitive disk such as disk 12. With proper design, and if no attempt is made to electronically correct for facet-to-facet errors in the scanning direction of the input scanner, the location of data on the disk track will contain phase shifts which exactly correspond to the facet errors of the rotating scanner. Thus, for example, a facet error resulting in delayed arrival of the scanning beam at the input document (late start of scan) will produce an identical delay in the signal to the recording modulator, resulting in a similarly delayed start of the corresponding recorded data on the disk 12.

Now consider a recorder using the same disk/scanner system. The data corresponding to the retarded facet will arrive late. So will the facet, by an exact corresponding amount. Therefore, the output scan line will start in the correct location. Thus, the total read/write system is inherently self-compensating, as long as a rigid angular relationship is maintained between the disk and the scanner.

Therefore, in such a total read/write system, the desired phase relationship is maintained, and standard facet errors are automatically compensated. As long as no random or otherwise variable shifts occur in the electronic modulator subsystem, it is possible to operate this system as a disk-modulated printer, without an output modulator. The simplification gained in the use of the disk as the optical modulator of the output beam may be small in such a system, since the required input modulator could in principle be used as an output modulator. However, the elimination of start and stop of scan detectors, there associated circuits, and any data buffer still provides significant system simplification.

A key ingredient to simplification of the disk-modulator system is the use of scanners fabricated from a common master by precision replication techniques. Not only are errors in such mirror likely to be low, but those that do exist will be substantially identical from one sample to another. If such mirrors are keyed to their motor shafts, and interchangeable optical disks similarly keyed, then the phase relationship between disk and polygon scanner is assured. Any minor keying error will produce a constant lateral shift in each scan line, and a neglible change in margin size, rather than any visible shearing of the image structure.

What is claimed is:

1. An optical data storage and retrieval system comprising:
    a photosensitive surface;
    an optical data storage disk having at least one data storage track divided into a plurality of data sectors, said data sectors being characterized by areas of different optical characteristics;
    an optical scanner having a plurality of reflective surfaces;
    said optical storage disk and said optical scanner being mounted on a common rotatable shaft, said optical storage disk and said optical scanner being mounted on said shaft such that at least some of said track sectors correspond geometrically with at least some of said reflective surfaces;
    means for providing a light beam of high intensity;
    means for projecting said light beam to a focused spot on said areas of a selected one of said data sectors whereby said light beam is amplitude modulated directly in accordance with the different optical characteristics of said areas; and
    means for projecting said amplitude modulated light beam onto the reflective surface of said scanner having a geometric correspondence to said selected one of said data sectors to thereby provide for scanning of said amplitude modulated light beam across said photosensitive surface.

2. The system of claim 1 wherein an optical delay line is interposed between said means for projecting said amplitude modulated light beam and said photosensitive surface.

* * * * *